United States Patent [19]

Schwarz et al.

[11] 4,159,675
[45] Jul. 3, 1979

[54] WIENER HEATING UNIT

[75] Inventors: John F. Schwarz; Ralph J. Tinkham, both of St. Louis, Mo.

[73] Assignee: Peabody International Corporation, Stamford, Conn.

[21] Appl. No.: 872,043

[22] Filed: Jan. 25, 1978

[51] Int. Cl.² ............................................. A47J 27/00
[52] U.S. Cl. ...................................... 99/444; 99/446; 126/369
[58] Field of Search .................. 99/339, 446, 444, 417; 126/369, 369.2

[56] References Cited

U.S. PATENT DOCUMENTS

| | | | |
|---|---|---|---|
| 2,562,723 | 7/1951 | Keller | 126/369 |
| 3,289,571 | 12/1966 | Lewus | 99/339 |

Primary Examiner—Leonard D. Christian
Attorney, Agent, or Firm—Rogers, Eilers & Howell

[57] ABSTRACT

A wiener steamer housing has a bun compartment, and has a wiener compartment over a base containing a heating element. A juice catch tray with side walls is suspended in the wiener compartment, and inserted in it is a wiener holding grill. The tray bottom catches juices from the wieners, and its sides, with holes at their upper ends, provide steam passages conducting heat to the upper wieners stacked on the grill.

15 Claims, 6 Drawing Figures

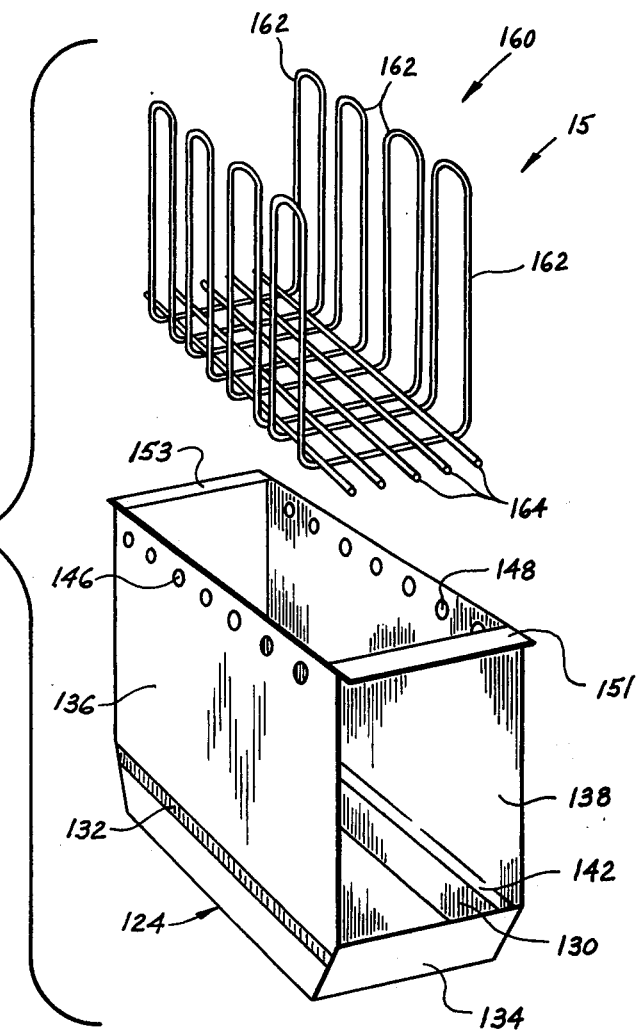
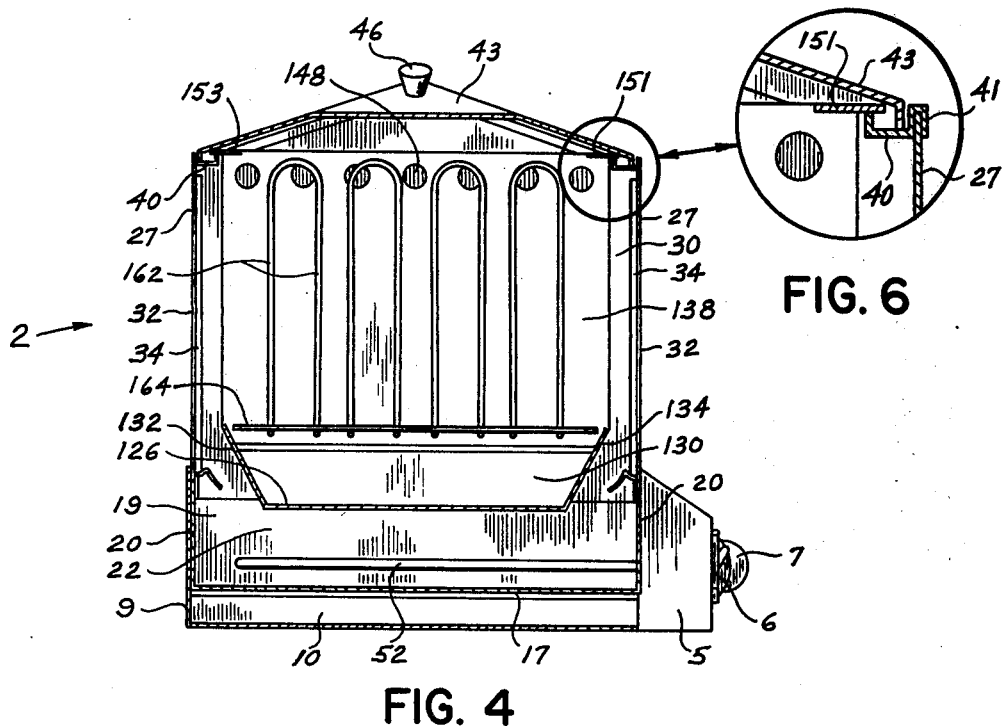

WIENER HEATING UNIT

BACKGROUND AND SUMMARY OF THE INVENTION

The present invention relates to wiener support assemblies used in heating units, usually for steaming wieners or "hot dogs", but also usable for heating other things if desired. It is more specifically concerned with such an assembly which achieves more direct and efficient heating of wieners on top of a wiener stack in the assembly and eliminates problems caused by the dripping of wiener juices onto heating elements in heating units.

The present invention overcomes the foregoing problems. It prevents the juices from falling into the water receptacle, and provides for their accumulation in a pan or tray that is readily removable. It also provides a means to conduct heat from the water receptacle directly to the upper parts of the stack of wieners on the grill, causing them to be heated quickly without overheating the lower ones. This it does by forming the juice pan with side walls extending from the pan at the bottom of the grill upward to the top of the compartment, spaced from the side walls of the compartment, with openings at the upper parts of the walls to permit steam to enter.

In the prior art, grills have been used in wiener heating units to support wieners above a heating element positioned in a water basin so that steam rises to heat the wieners. The grills upon which the wieners have been mounted have allowed wiener juices to drain through the grill into the water basin and coat the heating element which shortens the life of the heating element.

Prior art heating units also have heated the stack of wieners on the grill by heat rising from the water receptacle against the wieners at the bottom of the wiener stack, so that the wieners at the top of the stack are only indirectly heated by steam that passes through the lower wieners.

The present invention includes the juice tray that has as its object to prevent juices from the products being heated from discarding into the bottom of the steamer. It also has as its object to direct flow of convention currents to its upper end as well as to permit such to its lower parts. The juice tray is insertable from above into a walled heating compartment of the steamer, with means at its upper end to suspend it on the steamer with its tray receptacle above the bottom thereof.

A wiener grill is insertable from the top into the tray, and rests on inwardly extending ledges above the bottom of the tray to provide support for the stack of wieners.

A further feature is that the pan can be removed by being lifted out the top of the steamer.

Another feature is that the grill has grid-type sides that aid in supporting a stack of wieners within the juice tray walls. And this grill is also removable from the top of the steamer.

DESCRIPTION OF THE DRAWINGS

FIG. 4 is a section taken on the line 4—4 of FIG. 1 showing the support assembly installed within the body;

FIG. 5 is an exploded view of the wiener support assembly showing the grill positioned above the housing;

FIG. 6 is an enlarged view of an encircled portion of FIG. 4 showing one of the housing support plates resting on a leg of a channel shaped strip of the unit body.

DESCRIPTION OF THE PREFERRED EMBODIMENT

Figures 2, 3:
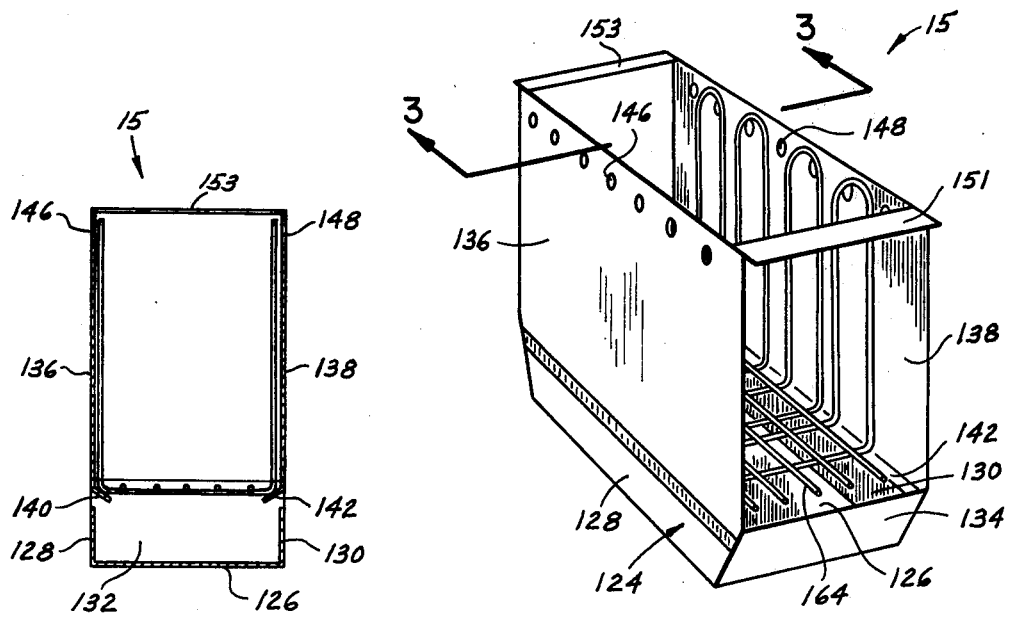
FIG. 2 is a perspective view of the wiener support assembly showing the grill mounted within the housing.
FIG. 3 is a section taken on the line 3—3 of FIG. 2.

The present invention is illustrated with a wiener and bun warming device 2 which comprises a main rectangular box shaped body 3 supported by a base 4. A wiener support assembly 15, as shown in FIGS. 2, 3 and 5 is mounted within body 3. The parts are generally of metal such as steel or stainless steel, as will be evident.

The base 4 has a front control mounting panel 5 which projects forwardly from the body 3. On the front panel are the main electrical switch 6 and the thermostat adjustment dial 8. The base has a rear support panel 9, which are joined together by a pair of channels 10.

The upper parts of the body 3 are of generally rectangular box shape to provide a wiener steaming compartment 21 and a bun warming compartment 22, as will appear. Body 3 fits within the front panel 5 and rear panel 9 and on top of channels 10.

Figure 1:
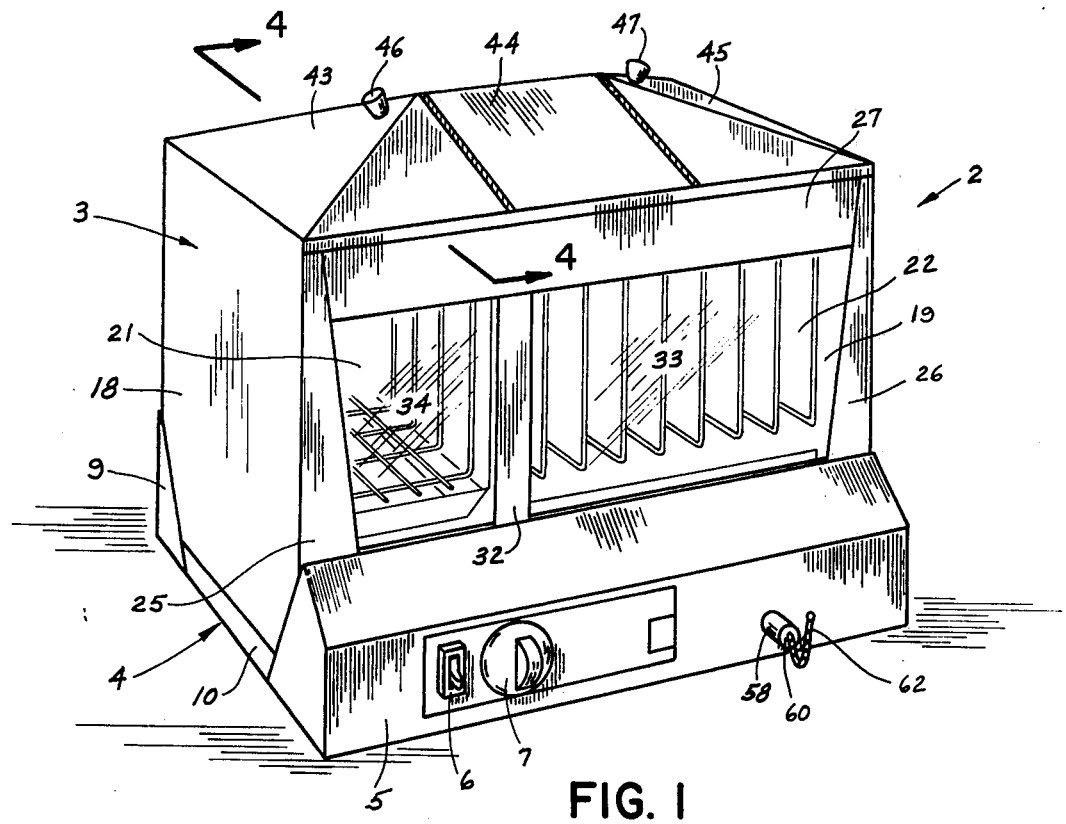
FIG. 1 is a perspective view of a wiener heating unit showing the wiener support assembly installed within the left part of the unit body and visible through a glass window.

The box shaped body 3 has a bottom wall 17 from which rise opposite end walls 18 and 19, and have front and back walls 20. These walls form a water receptacle basin 22 in the lower part of the steamer. The front and back are preferably symmetrical. At each end, as shown in FIG. 1, the end walls are unitary with front and rear edge walls 25 and 26, joined by narrow upper front and rear panels 27.

The body 3 is divided into the wiener and bun compartments by a solid partition 30 extending from front to rear, but terminating at its bottom edge above the bottom wall, so that the steam generating receptacle is common to both compartments. The partition 30 is joined to narrow vertical front and rear panels 32 extending from the lower front and rear walls to the upper front and rear panels. Front and rear glass panels 33 are secured in the front and rear of the bun compartment, and similar panels 34 are secured in the front and rear of the wiener compartment.

An upwardly open metal C channel gutter 40 extends around the inside top edge of the housing as seen in FIG. 4 and more specifically in enlarged FIG. 6. The outer leg 41 of each C channel 40 is bent into a U shape so that it can clamp around the upper edges of its respective panels 18, 19 and 27, and be spot welded thereto. Three lids 43, 44 and 45 enclose the top of the housing. The middle cover has its vertical edges resting in the channels 40, while the end covers are rotatable to be hinged open about the upper edges of the end walls 18 and 19 by lifting on knobs 46 and 47.

An electrical heating element 52 is secured above the bottom plate 17 within the walls of basin 22 to heat water in the basin so that steam can pass upward to heat wieners and buns as will be described. Element 52 is electrically connected to a standard outlet cord and plug, not shown, and is operated by switch 6 to heat water to a temperature set by thermostat dial 7.

A drain outlet 58 extends from the front lower body wall 20 through the front base panel 5 and is covered by a screw cap 60 which is attached to panel 5 by a chain 62. Removal of cap 60 allows water to drain from the basin 22.

The aforegoing environment is not part of the present invention, although parts of it are employed in combination in the present invention. The wiener support assembly 15 is shown specifically in FIGS. 2, 3 and 5 and is shown mounted within the body 3 in FIGS. 1 and 4. Wiener assembly 15 comprises essentially a drip pan assembly with high side walls, to be inserted into the wiener compartment, and a wiener grill insertable into the drip pan assembly.

The drip pan assembly 112 comprises a bottom metal drainage catch tray 124 formed with a bottom plate 126 as seen in FIG. 3, extending side walls 128 and 130 which are bent perpendicular to the plate 126, and front and rear end walls 132 and 134 which are bent to slant outwardly away from bottom plate 126. The slanted walls 132 and 134 have their edges joined to the conforming slanted edges of the ends of side walls 128 and 130 by welds to make the tray hold fluids, such as wiener juices.

The assembly 112 further comprises a pair of upper metal side walls 136 and 138 each of which has its lower front and rear corners secured firmly to the upper side edges of the slanted front and rear tray walls 132 and 134, as by welds. The bottom edges of each of the upper walls 136 and 138 are bent downwardly and inwardly into slanting edges 140 and 142 respectively at the bottom of the tray 124 to provide a grill support as will appear. A row of circular holes 146 and 148 extend through the top edges of the upper walls 136 and 138 respectively to provide passageways for steam to heat wieners mounted at the upper portion of the assembly. A pair of horizontal metal support flanges 151 and 153 extend from the front and rear upper corner edges of side walls 136 and 138 respectively. As seen in FIG. 4, when the assembly 112 is inserted from the top into the wiener compartment 21, the flanges 151 and 153 rest upon the interior legs of channels 40 as seen in FIG. 4 to support the assembly.

The plates, strips and sheets described as metal can be made of a durable metal such as stainless steel.

The drip pan assembly has a U shaped open wiener receiving grill 160. Grill 160 comprises four rigid metal loops 162 each of which is bent into a U shape. Loops 162 are aligned in parallel fashion and secured to one another by five parallel metal rods 164 each of which is spot welded to the bottom sections of the U loops 162 to form a criss-cross pattern. The various rods of the grill are spaced from each other distances to prevent wieners from inadvertently falling through them. The loops of the grill provide for gripping the grill to remove or insert it. As appears from the drawings, the juice pan assembly is inserted into the wiener compartment and is supported by the flanges 151 and 153, with its bottom wall above the heating element and the water level in the bottom of the housing. Its walls 136 and 138 are spaced narrowly from the walls of the compartment to permit steam and convection currents to rise outside those walls and at the ends of the assembly. The holes 146 and 148 permit the heat to enter at the upper part of the assembly.

The grill 160, when inserted from the top of the juice pan assembly, rests on the slanted edges 140 and 142 with its loops extending at least substantially to the top of the walls 136 and 138. Wieners can be stacked transversely or fore-and-aft on the grill.

OPERATION

Before installing the wiener assembly 15, water can be poured through the top of body 3 into the basin 22 to fill the basin with water to a level above heating element 52. To place wiener support assembly 15 within the wiener compartment 21 the upper support flanges 151 and 153 are grasped and the pan assembly is lifted above wiener compartment 21 with lid section 43 removed from the upper body 12. The pan assembly is then moved downwardly into compartment 21 until it reaches the position shown in FIG. 4 with the assembly support flanges 151 and 153 resting upon the inner leg of the front and rear C channels 40 as seen for support flange 151 in FIG. 6. In this position the pan assembly 112 is supported against downward movement by the C channels 40. The pan assembly side walls 136 and 138 are vertically disposed within compartment 21 adjacent and parallel to the left end wall 18 of the body 12 and the partition wall 30 respectively, so that a passageway exists between each of these adjacent walls to allow steam heated from the water in basin 22 to ascend between the walls and pass up to and through the wall holes 146 and 148. This allows the steam convection heating of the wieners at the top level of the housing.

Next the grill 150 is inserted within the pan assembly 112 by grasping the upper looped ends of the grill loops 116 with the fingers and moving the grill downward between the side walls 136 and 138 of the pan assembly 112 until the bent portions of the grill U-loops rest upon the slanted ledges 140 and 142 as seen in FIG. 3. In this position the grill rods 164 are beneath the upper edge of the slanted tray end walls 132 and 134, as seen in FIG. 4, which prevents grill 150 from sliding out of the open ends of the pan assembly 112. The height of the grill sides is greater than the distance between the support flanges 151 and 153 and the top edges of the tray end walls 132 and 134, which also prevents passage of grill 150 through the housing ends.

With assembly 15 installed, wieners can be placed lengthwise or crosswise on the bottom cross rods of the grill 150 and stacked up to the top of the sides of the grill. The extended sides of U-loops 162 keep the wieners off housing walls 136 and 138 when the wieners are placed lengthwise in the assembly. Buns can also be placed in a grill in the bun compartment 22. With the wieners and buns inserted in their compartments the lid sections can be placed on the top of the body 12 and switch 6 can be turned to the "on" position to supply electricity through the heating element 52 to heat the water in basin 22. Thermostat dial 7 can be set at an appropriate temperature to heat the wieners to the desired temperature by maintaining the water in the basin at the desired temperature level. A temperature of 160° F. has been found adequate. Steam or convection air currents rise from the basin between the walls of the housing and the main body as aforesaid so that the wieners at the top of the housing are heated directly by the steam rather than receiving the main source of heat from steam passing around the lower wieners or through heat conduction from the lower wieners. The heating of the top wieners is thus accelerated, and stratification levels of heat with the warmest wieners at the bottom and the coldest at the top are eliminated. Steam also rises upward around the slanted walls 132 and 134 of the tray 124 to heat the wieners.

As the wieners are heated wiener juices including fats, preservatives and additives, drip downwardly through the lower part of grill 150 and are caught in tray 124 so that the drippings do not drain into the basin water. Thus the drippings do not coat heating element 52 to accelerate destruction of the element. The edges 140 and 142 are close enough together to prevent the grill from dropping into the drip pan.

The wieners can be served from the assembly 15 by simply tilting lid 48 by the knob 43 and grasping the wiener with a serving tong. The wiener can then be placed on a bun removed from the bun compartment 22. As the wieners are removed from the top, the new top layer of wieners are heated through the holes 146 and 148 so that as the wieners continue to be served from the top, the top layer of wieners is receiving direct steam heat and can be served while hot. When the wiener level in the assembly is low, more wieners can be added by lifting the lid 43 and placing the wieners on the grill. After serving is finished, the assembly can be removed by again grasping the support flanges 151 and 153 and lifting the assembly 15 upward with lid 43 removed. If desired the grill 150 can be removed without removing pan assembly 112 from compartment 21 by simply grasping the upper ends of the loops 116 and lifting the grill upward out of the pan assembly.

When the assembly is removed, the drippings can be poured out of the tray into a proper disposal unit, and the pan assembly and grill can be cleaned. Because the catch tray has prevented the drippings from entering the basin 22, drippings do not need to be cleaned from the basin. After serving is complete the water within the basin can be drained by unscrewing drain cap 60 from the outlet tube 58 to allow the water to drain.

Tests conducted on the assembly show that wieners at the top of the wiener stack in pan assembly 112 are heated at a rate greater than that known in the prior art. This shortens the time period necessary to bring the top wieners to serving temperature and allows greater use of the steam heat and improved energy efficiency to be achieved.

Various chages and modifications may be made within this invention as will be readily apparent to those skilled in the art. Such changes and modifications are within the scope and teaching of this invention as described by the claims appended hereto.

We claim:

1. In a wiener steam heating device having a steam heating source, a wiener support assembly comprising:
   (a) a pan assembly positioned above the steam heating source and having means to catch wiener juices to prevent their draining beneath the pan assembly; and
   (b) a wiener support grill mounted by the pan assembly above the catch means so that juices from the wieners drain into the catch means.

2. The structure of claim 1 wherein the pan assembly comprises a pair of walls extending above the catch means, the walls having openings to allow passage of heat into the housing.

3. The structure of claim 2 wherein the pan assembly walls have holes in the upper ends of the walls.

4. The structure of claim 2 wherein the walls have means to support the grill.

5. The structure of claim 4 wherein the support means are slanted edges extending from the walls.

6. The structure of claim 1 wherein the pan assembly further comprises a pair of walls each having side ends, and a support flange at each end of the pan assembly engaging the two walls at each end of the walls.

7. The structure of claim 6 wherein each support flange extends partially beyond the side ends of the housing walls.

8. The structure of claim 6 wherein the grill has upperly extending sides, the catch means is a tray, and the shortest distance between the tray and each support flange is less than the height of the grill side.

9. The structure of claim 1 wherein the catch means is a tray.

10. The structure of claim 9 wherein the grill is supported beneath the top edge of the ends of the tray.

11. In a wiener steam heating device having a steam heating source, a wiener support assembly comprising:
   (a) a pan assembly having a catch tray positioned above the steam heating source;
   (b) the pan assembly having a pair of walls extending above the tray, the walls having an opening at the upper ends of the walls for allowing the passage of steam from the outside of the walls to the inside of the walls;
   (c) a wiener support grill mounted in the pan assembly at least partially above the tray and within the housing walls;
   (d) means to support the grill partially above the tray; and
   (e) a support flange at each end of the walls engaging the two walls at the upper ends of the walls.

12. A food steam heating machine for steam heating wieners and other foods, the machine having a bottom and a body providing a water supply source for steam heat at its bottom and a food-receiving walled compartment above the water supply source for steam heat; a drip pan assembly of a size to be inserted into the compartment, the pan assembly having a bottom including a juice drip tray receptacle and upstanding walls on opposite sides of the drip tray, means to support the assembly with the drip tray spaced above the steam heat source, the assembly walls being spaced to enable insertion of the assembly into the compartment with its upstanding walls spaced from the compartment walls to provide vertical convection steam heat current spaces therebetween to allow convection of steam heat upwardly along the sides of the assembly, means adjacent the upper parts of the upstanding walls of the assembly to admit steam heat convection currents to the interior thereof; a food grill insertable into the pan assembly to hold the food above the drip tray, and means to hold the grill above the bottom of the drip tray.

13. A food steam heating machine for steam heating wieners and other foods, the machine having a body with a bottom portion having means for heating steam and a food receiving walled compartment above the steam heating means, a food support assembly mounted in said compartment, said food support assembly comprising a grill for holding the food and further comprising means for catching drippings from the food, said catching means being located below the grill and above the steam heating means.

14. In a wiener steam heating device having a steam heating source, a wiener support assembly comprising:
   (a) a pan assembly positioned above the steam heating source and having means to catch wiener juices to prevent their draining beneath the pan assembly; and
   (b) the pan assembly comprising a pair of walls extending above the catch means, the walls having upper openings to allow passage of heat into the assembly and slanted edges extending from the walls;

(c) a wiener support grill mounted by the slanted wall edges above the catch means so that juices from the wieners drain into the catch means.

15. In a wiener steam heating device having a steam heating source, a wiener support assembly comprising:

(a) a pan assembly having a catch tray positioned above the steam heating source;

(b) the pan assembly having a pair of walls extending above the catch tray;

(c) a wiener support grill in the pan assembly within the walls and means to support the grill at least partially above the tray with a location space for wieners formed between the walls and above the lower edge of the walls, the walls being solid from their lower edges to above the wiener cooking space; and (d) the walls having an opening at the upper ends of the walls above the wiener location space for allowing steam from the steam heating source to pass from the outside of the walls to the inside of the walls to steam heat the wieners at the top of the wiener location space.

* * * * *